(12) United States Patent
Alderson et al.

(10) Patent No.: US 9,912,649 B1
(45) Date of Patent: Mar. 6, 2018

(54) SYSTEMS AND METHODS FOR FACILITATING COMMUNICATION BETWEEN AN AUTHENTICATION CLIENT AND AN AUTHENTICATION SERVER

(71) Applicants: Nathan Rowe Alderson, Huntsville, AL (US); Adam Kendall Dyess, Madison, AL (US)

(72) Inventors: Nathan Rowe Alderson, Huntsville, AL (US); Adam Kendall Dyess, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 92 days.

(21) Appl. No.: 14/589,644

(22) Filed: Jan. 5, 2015

(51) Int. Cl.
*H04L 29/06* (2006.01)

(52) U.S. Cl.
CPC .............. *H04L 63/08* (2013.01); *H04L 69/18* (2013.01)

(58) Field of Classification Search
CPC ......... H04L 12/56; H04L 12/28; H04L 12/26; H04L 63/08; H04L 69/18; H04J 3/14; H04J 3/16; H04J 3/22
See application file for complete search history.

(56) References Cited

U.S. PATENT DOCUMENTS

| | | | | |
|---|---|---|---|---|
| 7,031,328 B2* | 4/2006 | Thubert | ................. | H04L 29/06 370/401 |
| 7,337,224 B1* | 2/2008 | Van Horne, III | . | H04L 29/12283 709/223 |
| 8,499,338 B1* | 7/2013 | Breau | ................. | H04W 76/022 713/186 |
| 9,015,855 B2* | 4/2015 | Waisman-Diamond | .......... | H04L 29/12367 726/26 |
| 9,270,519 B2* | 2/2016 | Namihira | ............ | H04L 12/6418 |
| 9,275,204 B1* | 3/2016 | Orr | ......................... | G06F 21/30 |

(Continued)

OTHER PUBLICATIONS

Rigney, et al., RFC 2865, http://tools.ietf.org/html/rfc2865#section-2.3, Section 2.3, pp. 8-11, Jun. 2000.

(Continued)

*Primary Examiner* — Catherine Thiaw
*Assistant Examiner* — Wayne An
(74) *Attorney, Agent, or Firm* — Maynard Cooper & Gale, P.C.; Jon E. Holland

(57) ABSTRACT

An authentication relay and a NAT module of a telecommunication system facilitate communication between authentication clients and an authentication server. The authentication relay identifies authentication messages from the authentication clients intended for the authentication server. The authentication relay repackages the identified authentication message to add additional information. The NAT module translates the private IP address and UDP port number of the authentication client included in the original authentication message into a public IP address and unique UDP port number included with the repackaged authentication message sent to the authentication server. The same public IP address is used for authentication messages from a plurality of authentication clients thereby reducing the number of IP addresses required by the system. When a reply message is received from the authentication server, the NAT module uses the unique port number in the reply message to readdress the reply message for the authentication client.

21 Claims, 6 Drawing Sheets

(56) References Cited

U.S. PATENT DOCUMENTS

| | | | | |
|---|---|---|---|---|
| 2006/0067342 A1* | 3/2006 | Dispensa | .......... | H04L 29/12254 370/401 |
| 2006/0120293 A1* | 6/2006 | Wing | ............... | H04L 29/12009 370/241 |
| 2011/0320623 A1* | 12/2011 | Kivinen | .............. | H04L 12/4633 709/230 |
| 2013/0021949 A1* | 1/2013 | Kaal | .................... | H04W 48/16 370/255 |
| 2015/0304427 A1* | 10/2015 | Ortacdag | .............. | H04L 61/256 713/160 |
| 2015/0350599 A1* | 12/2015 | Yang | ........................ | H04N 7/15 348/14.02 |

OTHER PUBLICATIONS

Cisco Systems, Inc., "Configuring ISG as a RADIUS Proxy," pp. 1-19, Dec. 19, 2012.

Cisco Systems, Inc., "IP Addressing: DHCP Configuration Guide, Cisco IOS XE Release 3S," http://www.cisco.com/c/en/us/td/docs/ios-xml/ios/ipaddr_dhcp/configuration/xe-35/dhcp-xe-3s-book/dhcp-serv-rad-proxy-xe.html , pp. 1-10, Aug. 5, 2016.

\* cited by examiner

SYSTEMS AND METHODS FOR FACILITATING COMMUNICATION BETWEEN AN AUTHENTICATION CLIENT AND AN AUTHENTICATION SERVER

BACKGROUND

The present application generally relates to systems and methods for facilitating communication between an authentication client and an authentication server.

Network providers or carriers can require their subscribers or users (authentication clients) to authenticate with an authentication server before permitting access to a network. Remote Authentication Dial In User Service (RADIUS) is one type of protocol that can be used for the authentication of subscribers or users. When using RADIUS for authentication, the RADIUS client (authentication client) must exchange a series of messages with a RADIUS server (authentication server) during a single session. In order for the RADIUS client to exchange messages with the RADIUS server, each RADIUS client must have an Internet Protocol (IP) address. However, there are a limited number of available IP addresses, and many networks have a large number (e.g., thousands) of RADIUS clients that communicate with a RADIUS server.

To address the problem of needing a large number of IP addresses, some network providers or carriers have used a RADIUS proxy between the RADIUS clients and the RADIUS servers. When using a RADIUS proxy, the network provider or carrier uses a private network to connect the RADIUS clients (each having a private IP address) to the RADIUS proxy, and then the RADIUS proxy (having a single public IP address) is connected to the RADIUS server over a public network.

The RADIUS proxy receives the authentication requests and messages from the RADIUS clients addressed to the RADIUS proxy, disassembles the requests and messages, rebuilds the requests or messages and addresses the requests and messages for the RADIUS server. Similarly, the RADIUS proxy receives the authentication messages from the RADIUS server addressed to the RADIUS proxy, disassembles the messages and rebuilds and addresses the messages for the RADIUS clients. Unfortunately, the processing performed by the RADIUS proxy adds significant delay to the messages communicated between the RADIUS server and clients. In addition, the circuitry required to implement the RADIUS proxy can be complex, thereby undesirably increasing the costs to the network service provider.

SUMMARY

The present application generally pertains to systems and methods for implementing an authentication relay and a NAT (Network Address Translation) module between an authentication client and an authentication server. The authentication relay can be used to identify authentication messages from the authentication clients intended for the authentication server. If the authentication relay identifies an authentication message, the authentication relay can repackage the authentication message and add additional information into the authentication message as desired by the network provider or carrier. The repackaged authentication message is then provided to the NAT module. The NAT module can translate the private IP address and UDP port number of the authentication client into a public IP address and unique UDP port number that can be used as the source identifiers when sending the repackaged authentication message to the authentication server. To conserve public IP addresses, the NAT module may use the same public IP address for each authentication message from the authentication clients. When a reply message is received from the authentication server, the NAT module takes the destination UDP port number in the reply message and uses the destination UDP port number to determine the private IP address and UDP port number of the authentication client. The NAT module then readdresses the reply message to translate the public IP address and public UDP port number used as destination identifiers in the reply message into the private IP address and private UDP port number of the authentication client, respectively. The NAT module then sends the readdressed reply message to the corresponding authentication client.

One advantage of the present application is that the number of IP addresses used by authentication clients is reduced.

Another advantage of the present application is that authentication messages from authentication clients can be manipulated to add additional information useful for a network provider or carrier.

Still another advantage of the present application is that it can provide the authentication server protection from a denial of service attack.

Yet another advantage of the present application is that processing delays in the network can be reduced.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

The present application generally pertains to telecommunication systems that provision a switch module (SM) of a network access device to act or operate as an authentication relay. The relay function in the switch module can intercept authentication packets on a provisioned VLAN (Virtual Local Area Network) connected to the network access device and validate the MD5 (message digest 5) message authenticator in the authentication packet, discarding those authentication packets that cannot be validated in order to provide a level of DOS (Denial of Service) protection for the actual authentication server. The relay function can then add one or more provisioned authentication attributes to the authentication packet and recalculate the MD5 message authenticator for the authentication packet. A simple UDP (User Datagram Protocol) NAT (Network Address Translation) function in the SM can translate the private IP address and UDP port number of the authentication client connected via the VLAN to a single public IP address and a public UDP port number and send the authentication packet on to the authentication server. The authentication server can receive the authentication packet and respond to the public IP address of the SM in the network access device. In the downstream direction, the NAT function in the SM uses the destination UDP port number to look up the appropriate private IP address and UDP port number of the corresponding authentication client, replaces the destination identifiers in the authentication packet and sends the packet to the original authentication client. The authentication clients can be provisioned with private IP addresses without the need to acquire a public IP address for each authentication client, and both the authentication clients and the authentication server are unaware that the authentication relay is operating between them. In one embodiment, multiple authentication servers can be used to provide redundancy and load balancing. The authentication relay is provisioned with the IP addresses and shared secrets of each authentication server to enable the authentication relay to perform the MD5 message authenticator validation and recalculation, but the decision-making logic of which authentication server to use is left to the authentication client as it would be if no authentication relay were present.

Figure 1:
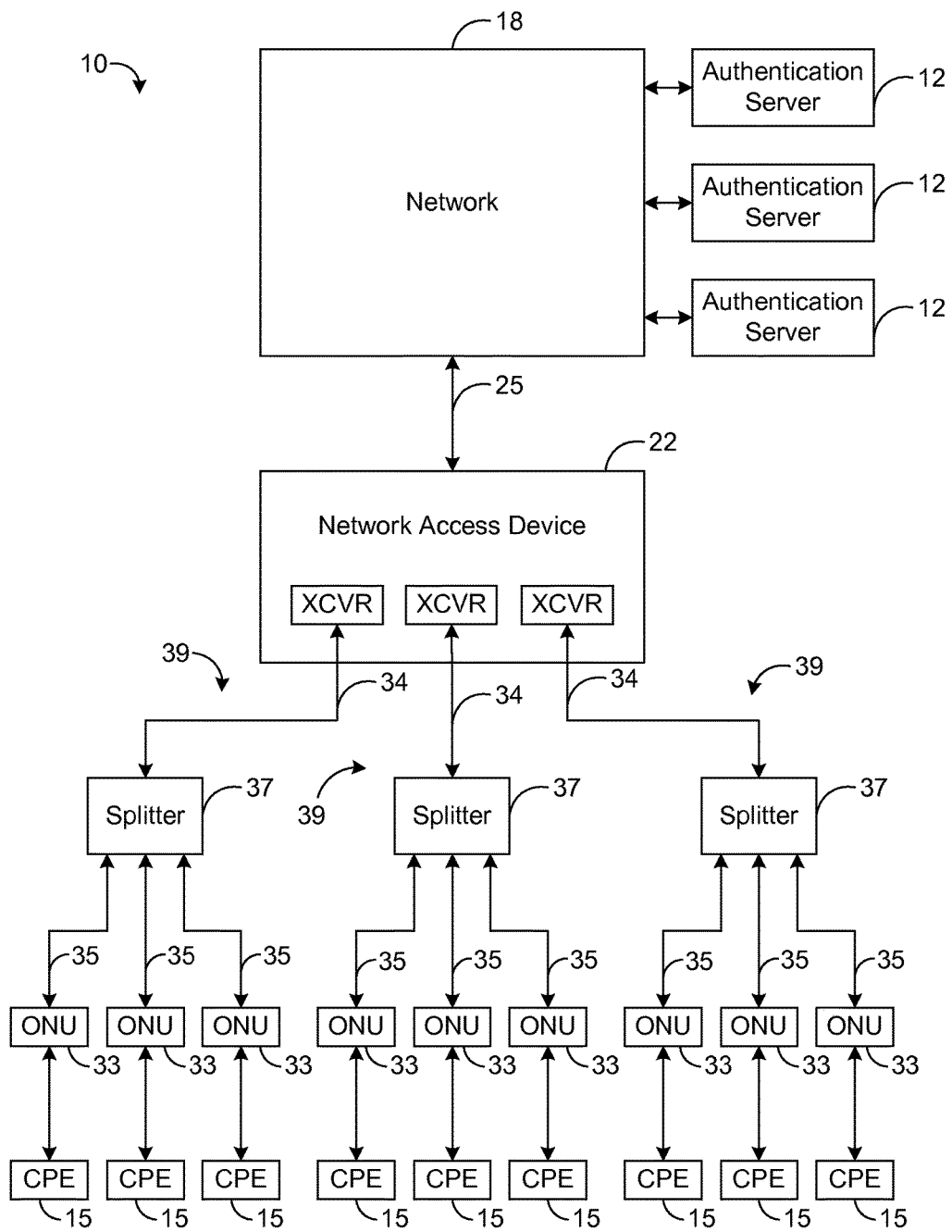
FIG. 1 is a block diagram showing an embodiment of a telecommunication system.

FIG. 1 depicts an embodiment of a telecommunication system 10 for communicating authentication packets between authentication servers 12 and customer premises equipment (CPE) 15 at locations (e.g., customer premises) remote from the authentication servers 12. Each authentication server 12 is coupled to at least one network 18, which can include any of various types of networks, such as the public switched telephone network (PSTN), local area networks (LANs), wide area networks (WANs), cellular networks, or the Internet. In the embodiment shown in FIG. 1, three authentication servers 12 can be used for redundancy purposes, but the system 10 may have any number of authentication servers 12 and CPEs 15.

The network 18 is coupled to a network access device (NAD) 22 by a network connection 25. In one embodiment, the network connection 25 can be an optical fiber, and the network 18 can multiplex the data streams from the authentication servers 12 and other data sources (not shown) into a single data stream for communication across the connection 25. In other embodiments, other types and numbers of network connections 25 may be used for communication between the NAD 22 and the network 18.

The NAD 22 can be used to facilitate communications, both upstream and downstream, between the CPEs 15 and the authentication servers 12 and other data sources connected to network 18. The NAD 22 can use one or more optical transceivers to exchange, i.e., send and receive, optical signals for communicating with the CPEs 15. In other embodiments, other types of transceivers are possible, including transceivers for exchanging electrical signals, such as digital subscriber line (DSL) transceivers.

Each optical transceiver (XCVR) can be coupled to a respective set of optical network units (ONUs) 33 by multiple communication connections 34, 35, which in the embodiment shown by FIG. 1 are optical fibers. Each optical fiber 34 from an optical transceiver can be coupled to a respective optical splitter 37 that splits signals from the optical transceiver across a multiple optical fibers 35. Each ONU 33 can receive at least one packet flow from the optical transceiver and convert the received packet flow(s) from the optical domain to the electrical domain. Each optical transceiver and the optical components coupled to it, including the optical splitter 37, ONUs 33, and optical fibers 34, 35 form a passive optical network (PON) 39 to communicate the packet flows via optical signals. In other embodiments, other types of optical channels and non-optical channels may be used to communicate the packet flows between the NAD 22 and the CPEs 15.

Three PONs 39 are shown in the embodiment of FIG. 1. However, in other embodiments, there may be any number of PONs 39, and each PON 39 may have any number of optical components, such as ONUs 33. The NAD 22 may have several access modules 52 (see FIG. 2), and any access module 52 may be coupled to and service any number of PONs 39.

Figure 2:
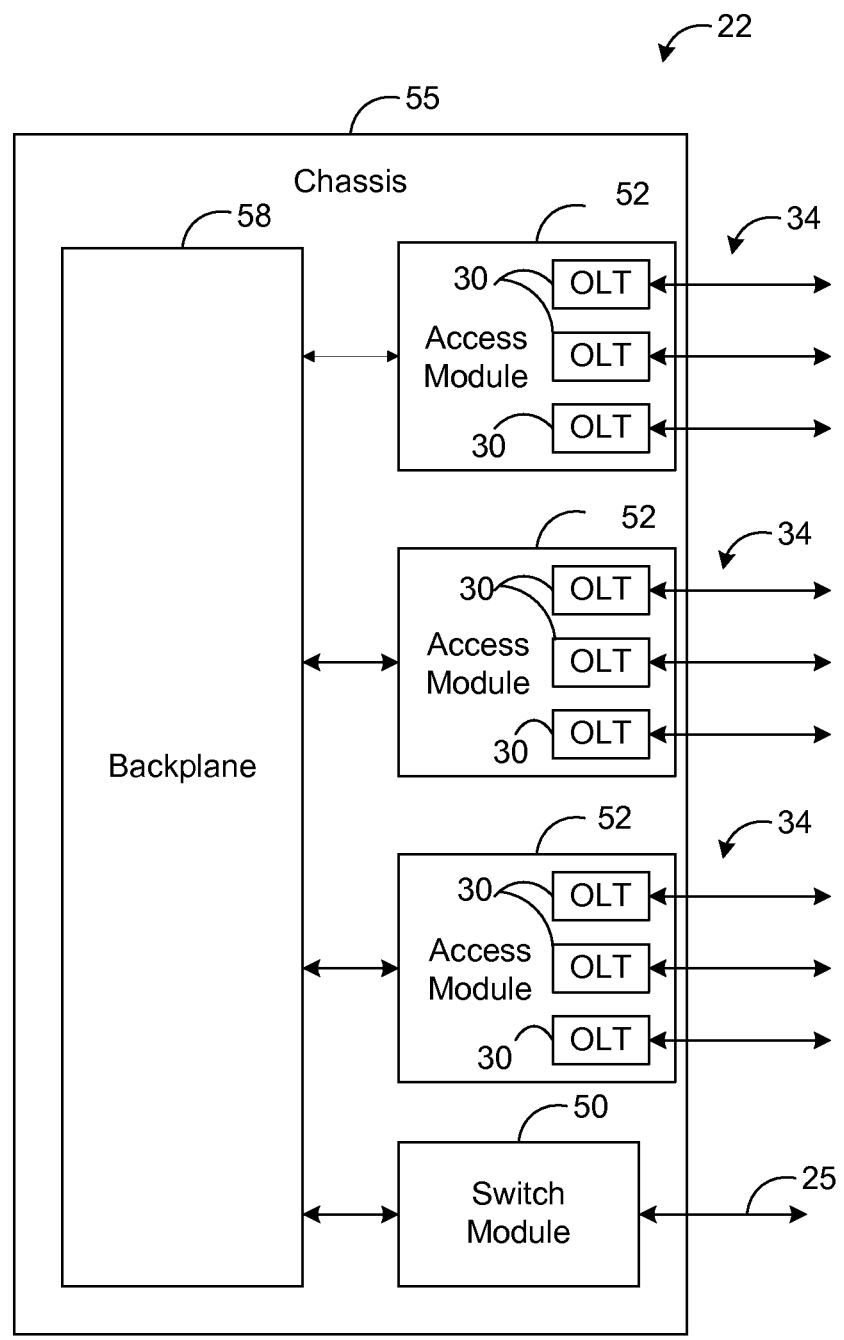
FIG. 2 is a block diagram showing an embodiment of a network access device.

FIG. 2 shows an embodiment of the NAD 22. The NAD 22 can include a switch module 50 that is coupled to the network connection 25 and one or more access modules 52 that can include one or more optical transceivers, such as optical line terminals (OLTs) 30, coupled to optical fibers 34 for communication with the ONUs 33 (see FIG. 1). In one embodiment, each module 50 and 52 can be inserted into a respective slot of a chassis 55 at a network facility, such as a central office, or at an intermediate point between a central office and customer premises. The chassis 55 can have an electrical or optical backplane 58 that electrically or optically couples the access modules 52 to the switch module 50 and to each other. In other words, any module 50 or 52 may communicate electrical or optical signals with any other module 50 or 52 via the backplane 58. In one embodiment, the backplane 58 can implement a star-type switching fabric where the switch module 50 communicates directly with the access modules 52, and the access modules 52 may communicate with one another through the switch module 50. However, other types of switching arrangements are possible in other embodiments. In the embodiment shown in FIG. 2, the NAD 22 has three access modules 52, each of which has three OLTs 30, and one switch module 50, but, in other embodiments, the NAD 22 may have any number of switch modules 50 or access modules 52 having any number of OLTs 30 or other types of transceivers, such as DSL transceivers.

When the NAD 22 receives communications in the downstream direction, i.e., communications from the network 18, the switch module 50 can receive the high-speed data stream from the network 18 via the network connection 25. The switch module 50 can demultiplex the data stream to recover the individual packet flows to be communicated to the CPEs 15. The switch module 50 transmits these packet flows across the backplane 58 to the access modules 52 based on their destinations. Specifically, for a given packet flow, the switch module 50 transmits the packet flow to the access module 52 and OLT 30 coupled to the CPE 15 that is to receive the packet flow. The access module 52 can convert the packet flow from the electrical domain to the optical domain, if needed, and the OLT 30 can transmit the packet flow across the appropriate optical fiber 34 for reception by the flow's destination ONU 33 and CPE 15.

In one embodiment, each demultiplexed packet flow from the switch module 50 can include packets for a respective service, e.g., Internet service, telephone service, and television service, that can be subscribed to by a customer. The downstream packet flow within the NAD 22 can generally correspond to and define downstream data for a respective service for a respective customer.

For communication with the NAD 22 in the upstream direction, i.e., communication to the network 18, the CPE 15 can communicate a packet flow in the electrical domain to the ONU 33. The ONU 33 can convert the packet flow from the electrical domain to the optical domain for communication over optical fiber 35. The optical signal transmitted by the ONU 33 passes through the splitter 37 to fiber 34 and ultimately to an OLT 30 in an access module 52. When packets are received by an OLT 30 from an optical fiber 34, the OLT 30 can convert the packets from the optical domain to the electrical domain and transmit the converted packets to a multiplexer, which multiplexes the data streams from multiple OLTs 30 to form a combined data stream for transmission across backplane 58 to the switch module 50. The switch module 50 can then multiplex the entire combined data stream (after completing any processing of packets that is required) and send the multiplexed stream across the network connection 25 to the network 18. In one embodiment where the network connection 25 is an optical fiber, the NAD 22 can convert the combined data stream to the optical domain, if needed, so that the combined data stream is optically communicated via the network connection 25.

In one embodiment, the ONU 33 can be connected to the NAD 22 over a private IP network. The ONU 33 (and correspondingly the CPE 15) can be assigned a private IP address by the OLT 30 to enable the ONU 33 (and the CPE 15) to communicate over the private IP network. In another embodiment, the private IP address of the ONU 33 (and the CPE 15) can be manually assigned by a service technician. Note that the private IP address is unique relative to private IP addresses assigned to other ONUs 33 of the system 10 but not relative to public IP addresses used for communication over a public network, such as network 18.

Once the ONU 33 has a private IP address, the ONU 33 is able to communicate with the NAD 22. However, before the ONU 33 can communicate with other data sources over the network 18, the ONU 33 has to be authenticated by an authentication server 12. To complete the authentication process, the ONU 33 and the authentication sever 12 have to exchange a series of messages during a single session. In other words, the ONU 33 and the authentication server 12 can have their own private "pipe" for communication during the authentication process. In order to exchange the authentication messages with the authentication server 12, the ONU 33 is expected to present a public IP address to the authentication server 12 for the entire authentication session. The switch module 50 can provide the ONU 33 with the public IP address required for communication with the authentication server 12, as will be described in more detail below.

Figure 3:
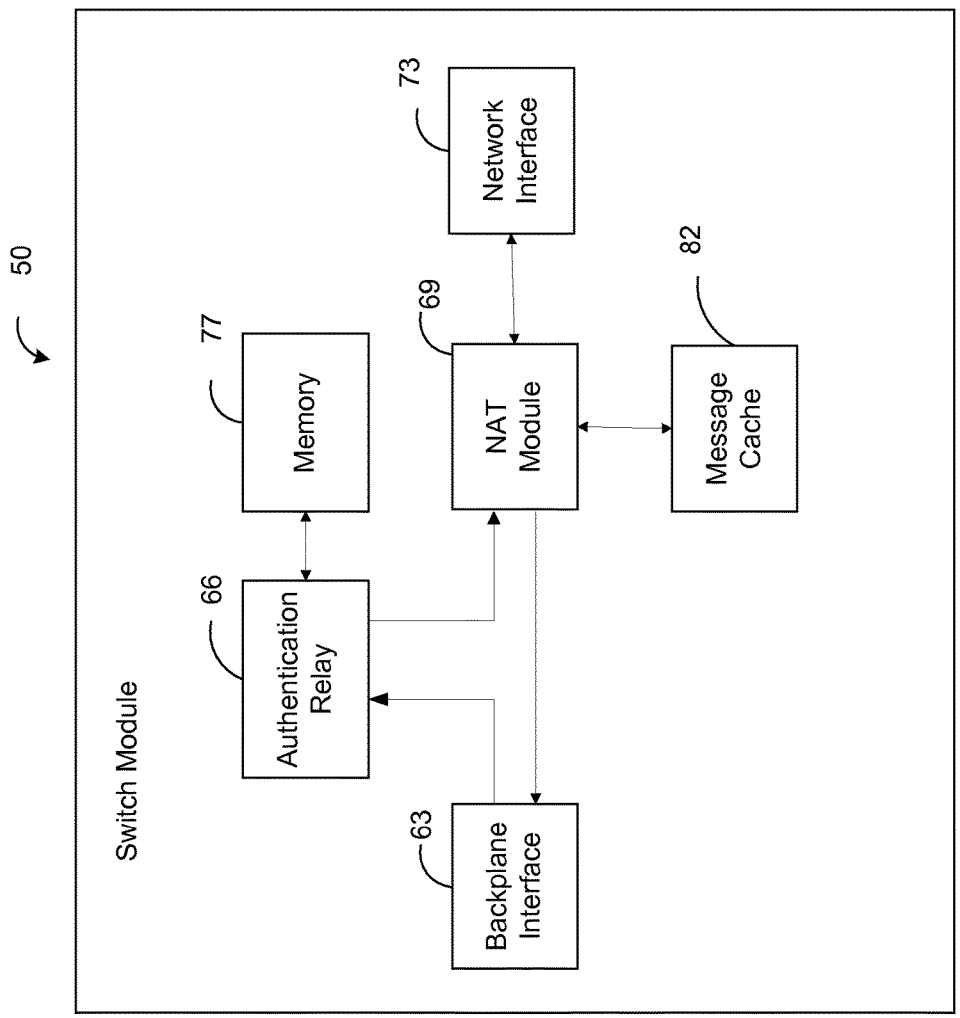
FIG. 3 is a block diagram showing various components of an embodiment of a switch module.

FIG. 3 shows an embodiment of a switch module 50 with the components used for the authentication process. It is to be understood that the switch module 50 shown in FIG. 3 may include additional equipment and/or components to perform additional functions and operations that are not shown in FIG. 3. The switch module 50 can have a backplane interface 63 that couples the switch module 50 to the chassis backplane 58 (see FIG. 2) and the access modules 52. The switch module 50 can also have a network interface 73 to couple the switch module 50 to the network connection 25 (see FIG. 1). Note that all of the components of the switch module 50 can reside on a printed circuit board (PCB), referred to as a "switch card." In other embodiments, other configurations of the switch module 50 are possible.

In the embodiment of FIG. 3, the switch module 50 can include an authentication relay 66 to identify authentication messages from the ONUs 33. An authentication message from an ONU 33 can have (1) the public IP address of the authentication server 12 and a public UDP port number as destination identifiers for the authentication message and (2) the private IP address and a private UDP port number of the ONU 33 as source identifiers for the authentication message. If the authentication relay 66 identifies a message from an ONU 33 as an authentication message, the authentication relay 66 can manipulate the authentication message, e.g., to add additional information to the authentication message or packet, and repackage the message for the NAT (Network Address Translation) module 69. The NAT module 69 can readdress the authentication message from the authentication relay 66 to have a public IP address and public UDP port number for the source identifiers instead of the private IP address and private UDP port number used as the original source identifiers.

The NAT module 69 readdresses the authentication message from the ONU 33 because a public IP address and public UDP port number are required for communication with the authentication server 12 over the public network 18. All of the readdressed authentication messages from the NAT module 69 can use a single public IP address and can be distinguished by the unique UDP public port number used as a source identifier in the readdressed authentication message. The single public IP address used for communication with the authentication servers 12 can be the public IP address of the NAD 22. The public UDP port number used for messages communicated by or with a given ONU 33 is unique relative to the UDP public port number used for messages communicated by or with other ONUs 33. As will be described in more detail below, the public UDP port number of a downstream message from the authentication server 12 can be used as a key to lookup the private IP address and private UDP port number of the ONU 33 that is to receive the message.

In any event, for each upstream authentication message, the NAT module 69 converts the private IP address and private UDP port number used as the source IP address and source UDP port number to a public IP address and unique public UDP port number, respectively, in the readdressed authentication message. The NAT module 69 can store the conversion or translation of such source identifiers in a message cache 82 or other memory device. For each ONU 33, the message cache 82 can include a table to map the ONU's private IP address and private UDP port number to the ONU's unique public UDP port number used by the NAT module 69 to readdress messages from the ONU 33. The table in the message cache 82 can then be used by the NAT module 69 to convert the public IP address and unique UDP public port number used as destination identifiers in a reply authentication message from the authentication server 12 to the private IP address and private port number of the ONU 33 that are associated with the public UDP port number in the table. Thus, the NAT module 69 can readdress the reply authentication message received from the authentication server 12 to have the private IP address and private UDP port number of the destination ONU 33 and provide the reply authentication message to such ONU 33.

In one embodiment, the NAT module 69 is configured to only process and readdress incoming messages that have a unique public UDP port number in the table of the message cache 82. By only readdressing messages that are in reply to messages sent from the NAT module 69, the NAT module 69 can operate similar to a firewall to restrict access to the ONUs 33 during the authentication process from other sources connected to network 18.

The readdressed reply authentication message can bypass the authentication relay 66 and be provided to the backplane interface 63 for communication to the ONU 33. The NAT module 69 may be implemented in hardware, software, firmware, or any combination thereof. In one embodiment, the NAT module 69 may be implemented in software that is stored in and executed by a processor (not shown).

The authentication relay 66 can be used to identify and manipulate authentication messages from the ONUs 33. For illustrative purposes, it will be assumed hereafter that the authentication server is a RADIUS server, but it should be emphasized that other types of servers and protocols may be used in other embodiments. As known in the art, a RADIUS server communicates using IP, which is a Layer 3 protocol within the Open Systems Interconnection model (OSI), and UDP, which is a Layer 4 protocol within the OSI. Thus, in the example described for FIG. 4, each authentication message has an IP packet (which includes a header having a source IP address and destination IP address) that encapsulates a UDP packet (which includes a header having a source port number and a destination port number).

As packetized messages from the ONUs 33 are received in the switch module 50 via backplane interface 63, the authentication relay 66 can review the received messages to determine if the messages include an authentication message for an authentication server 12. If the received message is identified or determined to be an authentication message, the authentication relay 66 can add additional information stored in memory 77 to the authentication message. The authentication relay 66 may be implemented in hardware, software, firmware, or any combination thereof. In one embodiment, the authentication relay may be implemented in software that is stored in and executed by a processor (not shown).

Figure 4:
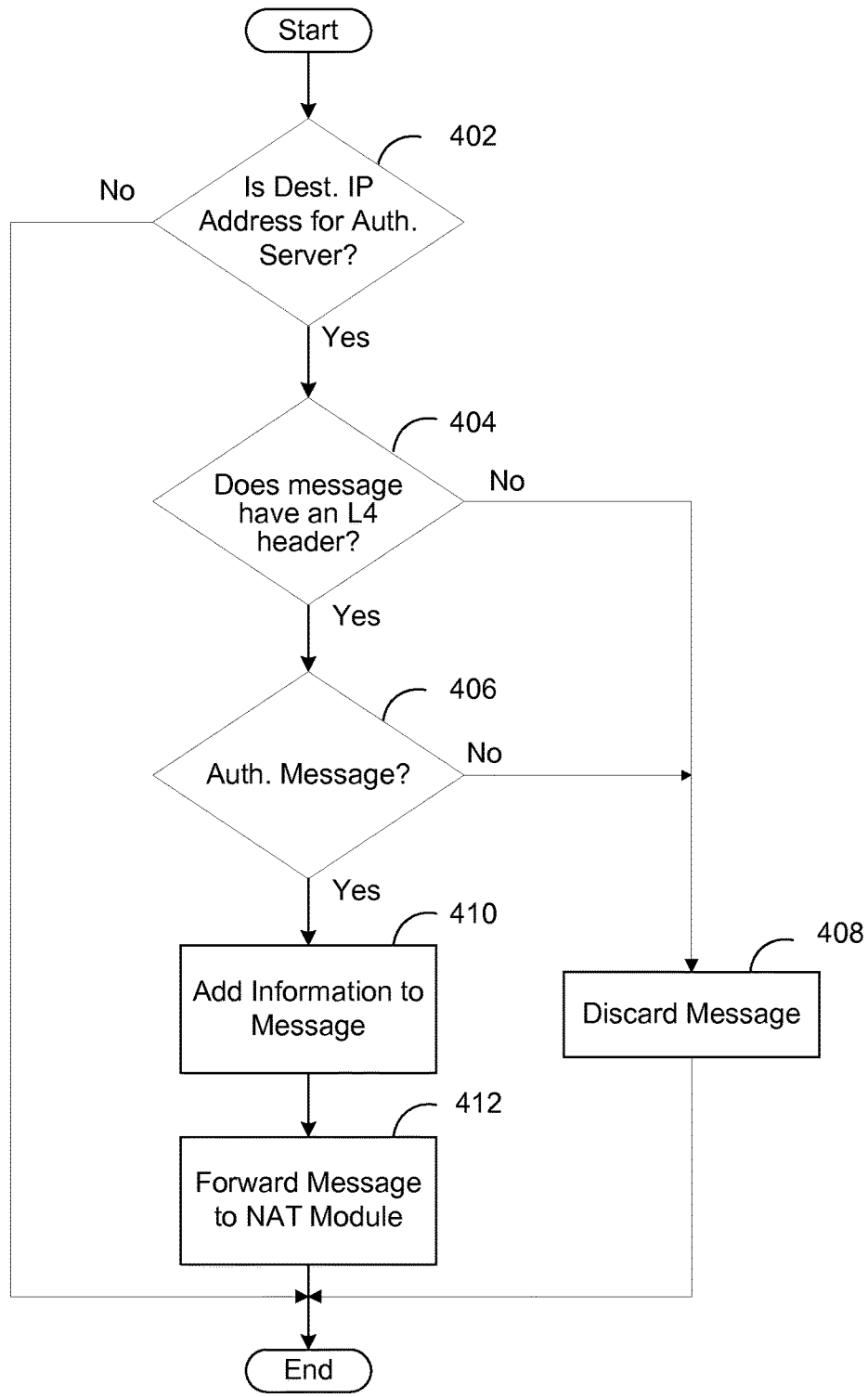
FIG. 4 is a flowchart showing an embodiment of a process for identifying and manipulating authentication packets from authentication clients.

FIG. 4 shows an embodiment of a process to identify and manipulate authentication messages that can be used by the authentication relay 66. The authentication relay 66 reviews a received message from the backplane interface 63 to determine if the destination IP address in the received message is an IP address for an authentication server 12 (step 402). The authentication relay 66 can be provisioned to know the IP addresses for all the authentication servers 12 that can be accessed by the ONUs 33. The authentication relay 66 can store the IP addresses for all primary authentication servers 12 and redundant authentication servers 12 in memory 77 or in another memory device. If the destination IP address is not an address for an authentication server 12, the process ends because the message is determined not to be an authentication message, and the message is permitted to continue upstream. However, if the destination IP address is an IP address for an authentication server 12, the authentication relay 66 then determines whether the structure of the message is consistent with the format of an authentication message. For example, when the authentication server 12 is a RADIUS server that uses UDP, as described above, the authentication relay 66 may determine if the message has a Layer 4 header in accordance with UDP (step 404). If the message does not have a Layer 4 header in accordance with UDP, then the RADIUS relay 66 determines that the message is not a proper authentication message and thus discards the message (step 408) without transmitting it upstream.

However, if the message does have a Layer 4 header in accordance with UDP, the authentication relay 66 further analyzes the contents and format of the message to determine whether it is an authentication message (step 406). Note that the contents and format of an authentication message can be dependent on the authentication protocol being used, and the techniques for determining whether the message is an authentication message may likewise be dependent on the authentication protocol being used. For example, authentication messages from the ONU 33 using the RADIUS protocol can have a message authentication or authenticator value that is formed using an MD5 hash function. The MD5 hash function uses a "shared secret" that can operate as the cipher or seed of the hash function. In one embodiment, the "shared secret" can be known by the authentication (RADIUS) server 12, the ONU (RADIUS client) 33 and the authentication (RADIUS) relay 66. To determine whether the message is a RADIUS authentication message, the authentication relay 66 can execute the hash function on the contents of the message using the "shared secret" to obtain a hash value. The authentication (RADIUS) relay 66 can then compare the generated hash value to the message authenticator value in the message. If the generated hash value matches the message authenticator value from the message, then the packet is a RADIUS authentication packet. Otherwise the packet is determined to be an improper authentication packet.

Referring back to FIG. 4, if the message is determined not to be an authentication message (in step 406), then the message is discarded (step 408) and the process ends. If the authentication relay 66 determines that an authentication message is present, the authentication relay can add additional information to the authentication message (step 410) and forward the message with the modified authentication packet to the NAT module (step 412). In one embodiment, the authentication relay 66 can add information relating to one or more of the following: the name of aggregator or NAD 22; the vendor supplying the NAD 22; the IP address of the NAD 22; the split number of the splitter 37; the port number of the OLT 30; and the number of the PON 39. The information on the name of aggregator or NAD 22, the split number of the splitter 37, the UDP port number of the OLT 30 and the number of the PON 39 can be stored in memory 77 and associated with the appropriate ONUs 33.

Further, depending on the technique used to determine if the message is an authentication message, the authentication relay 66 may perform some additional manipulation of the authentication message before providing it to the NAT module 69. For example, if the RADIUS protocol is used by the ONU 33 and authentication server 12, the authentication relay 66 recalculates the message authentication value using the MD5 hash function and the "shared secret" to account for the additional information added to the packet before providing the authentication message to the NAT module 69.

Figure 5:
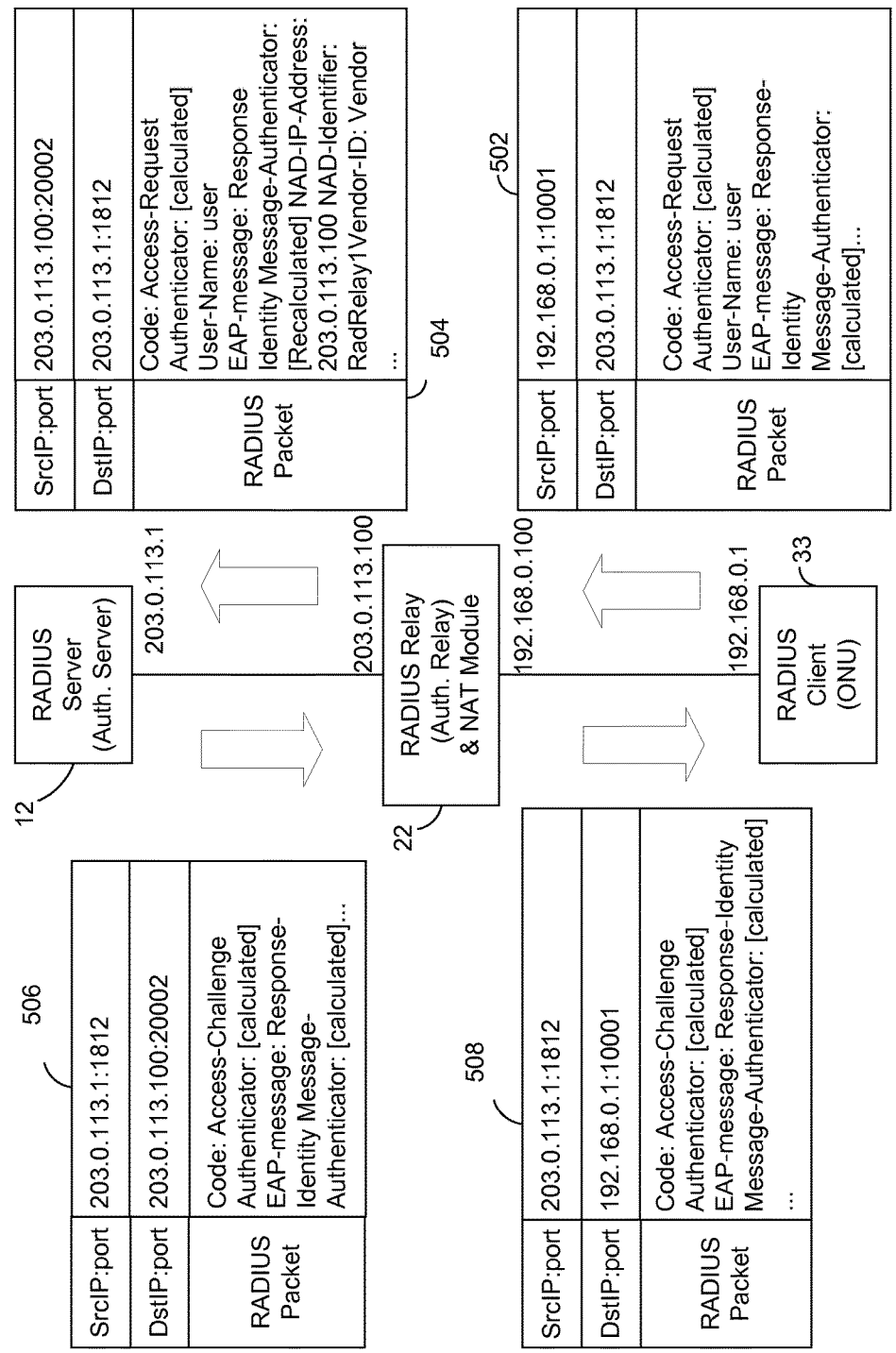
FIG. 5 is a block diagram showing the communication of authentication messages in one embodiment.

FIG. 5 is a block diagram showing the communication of authentication messages using the RADIUS protocol in one embodiment. In the embodiment of FIG. 5, a RADIUS client (or ONU) 33 has a private IP address of 192.168.0.1, the NAD 22 (incorporating a RADIUS relay (or authentication relay) and a NAT module) can have a private IP address of 192.168.0.100 and a public IP address of 203.0.113.100, and the RADIUS server (or authentication server) 12 can have a public IP address of 203.0.113.1. When the RADIUS client 33 has to authenticate with the RADIUS server 12, the RADIUS client 33 can send an authentication message 502. The authentication message 502 can include the IP address of the RADIUS server 12 as the destination IP address, the UDP port number of the RADIUS server as the destination UDP port number, and predetermined information in a RADIUS authentication message 502. In one embodiment, the information in the RADIUS authentication message 502 can include code information, a calculated authenticator value, user name information, EAP message information and a message authenticator value (which corresponds to the output of the MD5 hash function).

The authentication message 502 is received by the RADIUS relay in NAD 22 and is determined to be a message requesting authentication. The RADIUS relay adds additional information, e.g., NAD-IP-Address, NAD-Identifier and Vendor-ID, to the RADIUS packet and the NAT module readdresses the initial source identifiers, i.e., the private IP address and the private UDP port number of the RADIUS client, to the updated source identifiers, i.e., the public IP address of the NAD 22 and an assigned unique public UDP port number, to form authentication message 504. The NAT module can correlate the unique public UDP port number in the updated or readdressed source address to the private IP address and the private UDP port number of the RADIUS client. Authentication message 504 is then sent to the RADIUS server 12 for further processing.

After processing authentication message 504, the RADIUS server 12 can send a reply authentication message 506. The reply authentication message 506 can have the public IP address for the NAD 22 and the unique public UDP port number as the destination identifiers, i.e., destination IP address and destination UDP port number, respectively. Such information is obtained from the source identifiers of the original authentication message for which the reply authentication message is being generated. The reply authentication message 506 is received by the NAT module 69 in NAD 22. The NAT module readdresses the initial destination identifiers, i.e., the public IP address for the NAD 22 and the unique public UDP port number assigned by the NAT module 69, in the reply authentication message 506 to the updated destination identifiers, i.e., the private IP address and private UDP port number of the RADIUS client 33, to form reply authentication message 508. The NAT module 69 readdresses the reply authentication message 506 using the mapping information stored in the message cache 82. As can be seen in reply authentication messages 506 and 508, the NAT module 69 only changes the destination identifiers, i.e., the destination IP address and UDP port number, of the reply authentication message 506 when generating reply authentication message 508 and does not alter the remaining contents of the reply authentication message 506, which are included in reply authentication message 508. The reply authentication message 508 is then sent to the RADIUS client 33.

Figure 6:
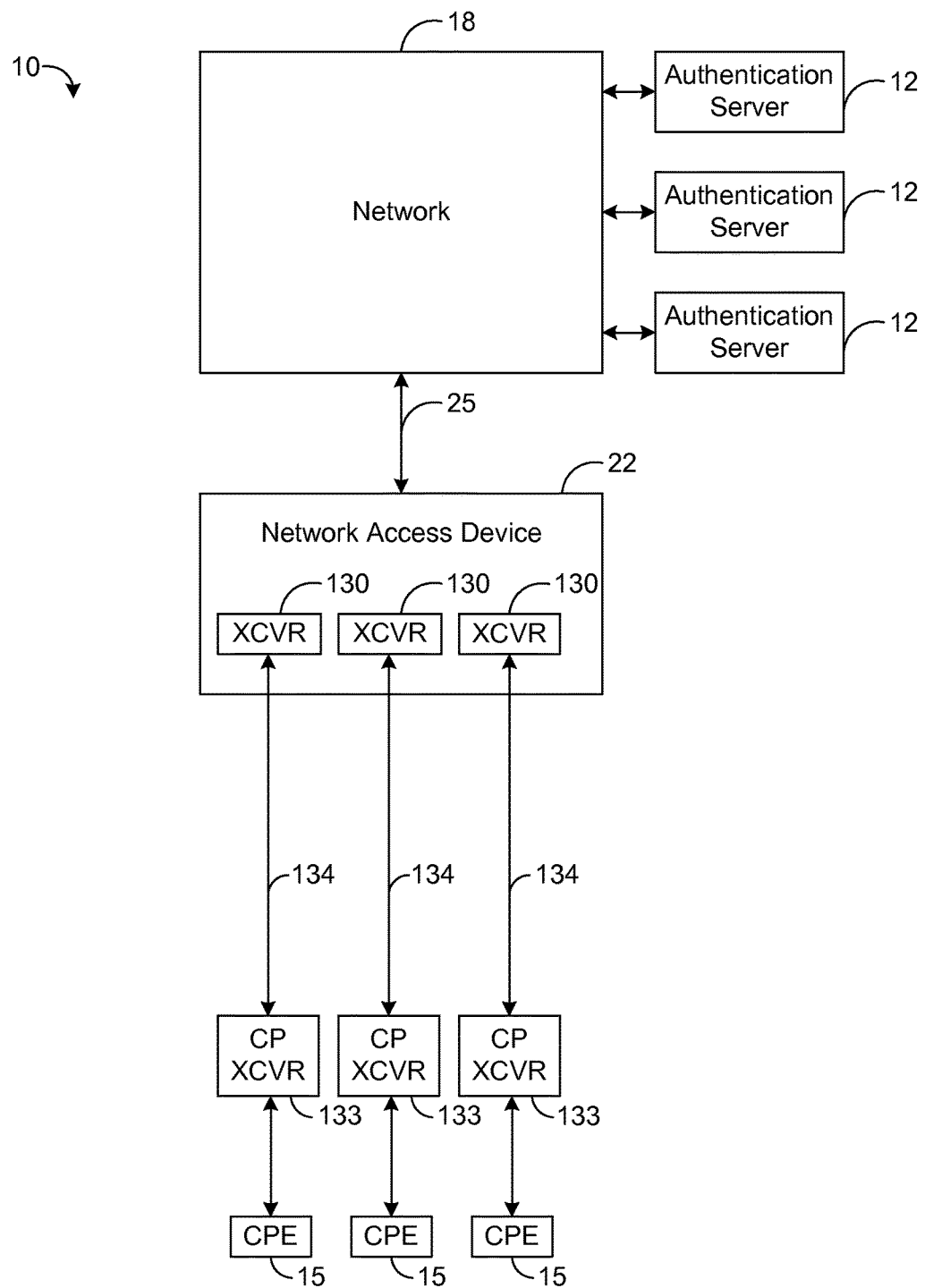
FIG. 6 is a block diagram showing another embodiment of a telecommunication system.

It should be further noted that various techniques may be used for communicating between the NAD 22 and the CPE 15. As an example, FIG. 6 depicts an embodiment of a system 10 in which the NAD 22 has electrical transceivers (XCVR) 130. Each electrical transceiver 130 can then be coupled to a customer premises transceiver (CP XCVR) 133 via a respective conductive connection 134, such as a twisted-wire pair. In one embodiment, the transceivers 130, 133 communicate via DSL (e.g., asymmetric DSL (ADSL), high-bit-rate DSL (HDSL), very-high-bit-rate DSL (VDSL), VDSL2, or any other type of DSL) or other known protocol. If desired, multiple communication connections 134 may be aggregated (e.g., bonded) in order to define a single virtual channel. The NAD 22 in the embodiment depicted by FIG. 6 operates essentially the same as the NAD 22 depicted by FIG. 1 except that electrical signals rather than optical signals are communicated between the NAD 22 and the customer premises equipment 15. With regard to the embodiment of FIG. 6, the authentication relay 66 and the NAT module 69 in the switch module 50 of NAD 22 can operate in a similar manner to that described above except that the authentication relay 66 and the NAT module 69 are processing authentication messages associated with a CP XCVR 133 instead of an ONU 33.

In another embodiment, the authentication relay 66 can be used to modify and/or manipulate reply authentication messages from the authentication server 12. After the NAT module 69 has readdressed the reply authentication message from the authentication server 12, the NAT module 69 can provide the readdressed reply authentication message to the authentication relay 66 for modification and/or manipulation in a manner similar to the modification of the authentication message for the authentication server 12. The authentication relay 66 can provide the modified readdressed reply authentication message to the backplane interface 63 for communication to the ONU 33.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A network access device of a telecommunication system, the network access device comprising:

an interface having connections for a plurality of transceivers, each of the transceivers coupled between the network access device and customer premises equipment (CPE);

an authentication relay coupled to the interface, the authentication relay configured to review messages from the plurality of transceivers to determine if a message from one of the transceivers is an authentication message, wherein the authentication relay is configured to determine the message is an authentication message in response to at least one of a destination address of the message identifies the authentication server, a destination port number of the message corresponds to the authentication server, or a header of the message has a proper format for an authentication message, the message having a first source address identifying the one transceiver and the CPE, wherein the first source address is a private Internet Protocol (IP) address;

a network address translation module coupled to the authentication relay and configured to readdress the message by changing the first source address of the message to a second source address, wherein the second source address is a public IP address for identifying the network access device in response to the authentication relay identifying the message as an authentication message, the network address translation module configured to transmit the readdressed message to the authentication server and to receive a reply from the authentication server, wherein the reply includes a first User Datagram Protocol (UDP) port number, the network address translation module configured to readdress the reply by changing a second destination address to a third destination address based on the first UDP port number being stored in a message cache, the network address translation module coupled to the interface by a bypass connection and configured to provide the readdressed reply to the interface for transmission to the CPE via the bypass connection thereby bypassing the authentication relay, the second destination address corresponding to the second source address and the third destination address corresponding to the first source address.

2. The network access device of claim 1, wherein:
the authentication relay is configured to apply a hash function to the message to generate a first hash value and compare the first hash value to a second hash value included in the message; and
the authentication relay is configured to determine that the message is an authentication message in response to the first hash value matching the second hash value.

3. The network access device of claim 2, wherein the authentication relay is configured to discard the message in response to the first hash value being different from the second hash value.

4. The network access device of claim 1, wherein the second destination address is a public IP address identifying the network access device, and wherein the third destination address is the private IP address identifying the one transceiver.

5. The network access device of claim 4, wherein the network address translation module is configured to associate the first UDP port number and the private IP address in the message cache in response to changing the first source address of the message.

6. The network access device of claim 5, wherein the network address translation module is configured to change the first UDP port number to a second UDP port number in the reply.

7. The network access device of claim 1, wherein the network address translation module is configured to discard the reply in response to the first UDP port number not being stored in the message cache.

8. The network access device of claim 1, wherein the readdressing of the reply by the network address translation module does not alter other contents of the reply.

9. The network access device of claim 1, wherein the authentication server is Remote Authentication Dial In User Service (RADIUS) authentication server.

10. The network access device of claim 1, further comprising a memory device coupled to the authentication relay, the memory device storing an IP address for the authentication server, wherein the authentication relay is configured to access the IP address for the authentication server stored in the memory device to determine if the message is an authentication message.

11. The network access device of claim 10, wherein the memory device is configured to store additional information to be inserted in an authentication message, at least a portion of the additional information being associated with the CPE, wherein the authentication relay is configured to insert the additional information into the message in response to the determination that the message is an authentication message.

12. The network access device of claim 1, wherein the message cache has a table to map the first source address to the second source address in response to the network address translation module changing the first source address of the message to the second source address.

13. The network access device of claim 12, wherein the network address translation module is configured to access the table with the mapping of the first source address to the second source address in the message cache when changing the second destination address of the reply to the third destination address.

14. A method for use in a telecommunication system, the method comprising:
receiving, via an interface at a network access device, a message from a transceiver of a plurality of transceivers, the transceiver coupled between the network access device and customer premises equipment (CPE), wherein the message includes a first source address and a first destination address, wherein the first source address is a private Internet Protocol (IP) address identifying the transceiver and the CPE;
determining, by an authentication relay coupled to the interface at the network access device, if the message is an authentication message requesting authentication from an authentication server, wherein the authentication relay is configured to determine the message is an authentication message in response to at least one of a destination address of the message identifies the authentication server, a destination port number of the message corresponds to the authentication server, or a header of the message has a proper format for an authentication message;
readdressing the message, by a network address translation module coupled to the authentication relay of the network access device, to change the first source address to a second source address in response to a determination that the message is an authentication message, wherein the second source address is a public IP address for identifying the network address device;
sending, by the network access device, the readdressed message to the authentication server;
receiving a reply from the authentication server at the network access device, the reply including a third source address and a second destination address, the reply being sent by the authentication sever in response to the readdressed message;
readdressing the reply by the network address translation module, wherein the reply includes a first User Datagram Protocol (UDP) port number, by changing the second destination address to a third destination address based on the first UDP port number being stored in memory, the second destination address corresponding to the second source address, the third destination address corresponding to the first source address; and
sending, by the network address translation module, the readdressed reply to the transceiver, wherein the sending the readdressed reply bypasses the authentication relay.

15. The method of claim 14, further comprising modifying the message in response to a determination that the message is the authentication message, wherein modifying the message includes at least one of adding additional information to the message, deleting information from the message or changing information in the message.

16. The method of claim 15, wherein the additional information includes at least one of a name for the network access device, a vendor supplying the network access device or an Internet Protocol address for the network access device.

17. The method of claim 15, wherein the modifying the message includes:
   applying a hash function to the modified message to obtain a hash value; and
   inserting the hash value into the modified message.

18. The method of claim 14, wherein the proper format for the authentication message has a User Datagram Protocol format.

19. The method of claim 14, wherein the determining if the message is an authentication message further comprises:
   applying a hash function to the message to generate a first hash value;
   comparing the first hash value to a second hash value included in the message.

20. The method of claim 14, wherein the readdressing the reply comprises changing the first UDP port number to a second UDP port number.

21. The method of claim 14, further comprising mapping in the memory the first UDP port number to the private IP address, wherein the readdressing the reply is based on the mapping.

* * * * *